United States Patent Office 3,392,438
Patented July 16, 1968

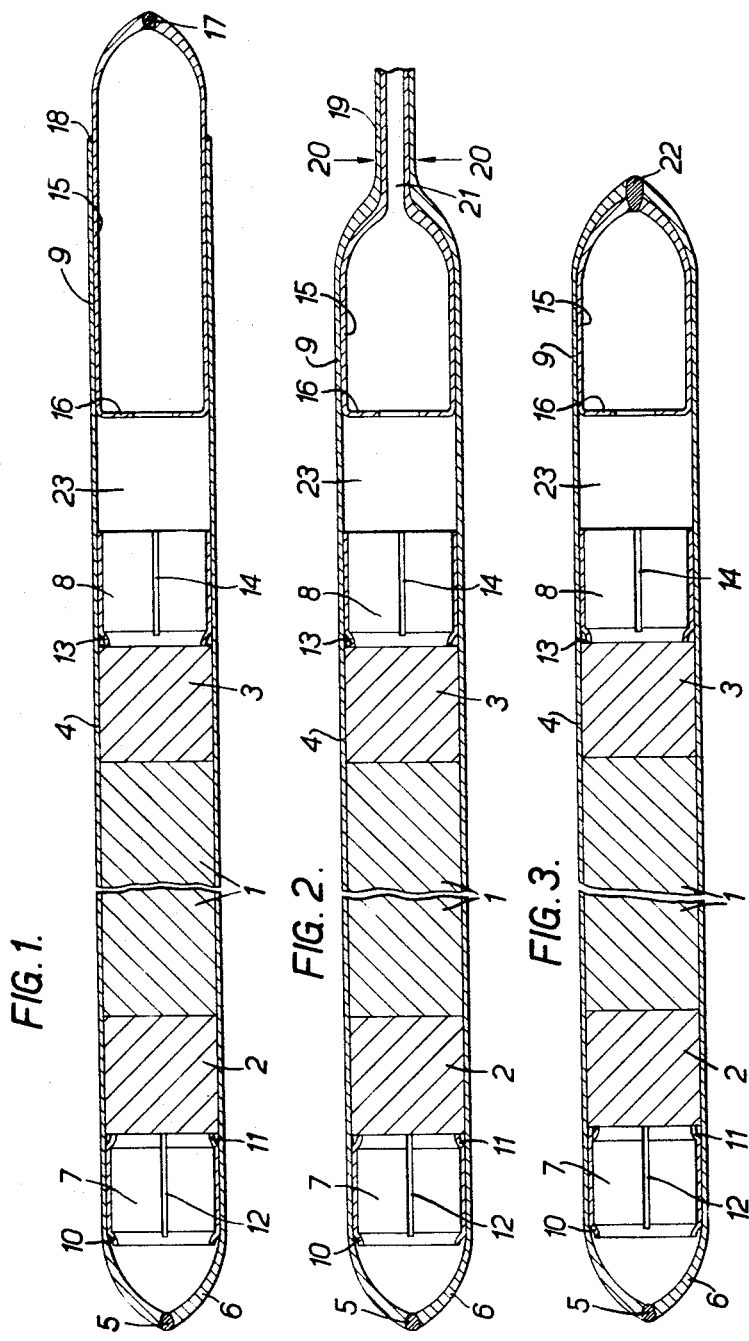

3,392,438
METHOD OF CLOSING ENDS OF PROTECTIVE TUBES FOR NUCLEAR REACTOR FUEL ELEMENTS
Robert Smith Coulter, Thurso, Caithness, Scotland, and William Oldfield, Toledo, Ohio, assignors to United Kingdom Atomic Energy Authority, London, England
Filed Mar. 30, 1965, Ser. No. 444,005
Claims priority, application Great Britain, Apr. 7, 1964, 14,388/64
6 Claims. (Cl. 29—477)

ABSTRACT OF THE DISCLOSURE

A method of closing the ends of protective tubes for nuclear reactor fuel elements of the pin type, comprising assembling a tubular support member within an end of a protective tube, so that a portion of the outer surface of the member engages the opposing inner surface of the protective tube, swaging an apertured neck in the region of the engaged surfaces, cutting through the neck to expose the aperture and then sealing the aperture by welding.

This invention relates to nuclear reactor fuel elements.

One of the most widely used types of nuclear reactor fuel element is that in which nuclear fuel material is sheathed in a protective tube closed at its extremities by end caps. Each of the two end caps is sealed to the sheath by a circumferential butt weld formed by an argon arc welding process. The use of these welded end caps presents difficulties when the fuel elements are of small size in cross-section, such as those referred to as fuel element pins. These difficulties are associated with various factors which include the need for precision in control of weld penetration, the desirability of minimizing the zone affected by weld heat, the fact that abrupt changes in cross-section occur in the immediate vicinity of the weld, and grain growth in the welded components.

According to one aspect of the present invention a method of closing an end of a protective tube for a pin-type nuclear reactor fuel element comprises shaping the end by swaging to form an apertured neck thereon and sealing the aperture by welding.

According to another aspect of the present invention, a method of closing an end of a protective tube for a nuclear reactor fuel element of the pin-type comprises assembling a tubular support member together with said tube end in such manner that a portion of one surface of said member engages an opposing surface of said tube end, forming an apertured neck on the assembly in the region of the engaged surfaces by swaging, and sealing the aperture by welding.

The support member is preferably positioned with a portion inside the tube and a portion outside the tube, the portion outside the tube having a closed end.

Prior to forming the neck, the tube end and the support member are preferably joined together by welding.

The invention also includes within its scope a protective tube for a nuclear fuel element having an end closure formed by the method disclosed in the four preceding paragraphs.

In the accompanying exemplifying drawings, FIGURES 1 to 3 are enlarged sectional elevations showing different stages in end closure of a protective tube of a nuclear reactor fuel element by the method of the present invention.

The drawings show a nuclear reactor fuel element of the pin type comprising nuclear fuel material 1 sandwiched between natural uranium oxide pellets 2, 3, and a protective tube 4 enclosing the fuel 1 and pellets 2, 3. The tube 4 is typically made of stainless steel and 0.2" internal diameter with a wall thickness of 0.015" whilst the fuel material 1 is typically enriched uranium oxide or plutonium oxide or a mixture thereof in the form of a stack of pellets or compacted powder. In accordance with the invention, one end of the empty tube 4 is shaped by die swaging to form an apertured neck thereon. After removal of any surplus material, the aperture is sealed by an argon arc spot weld 5, so that end 6 of the tube 4 is of near hemispherical form.

After cleaning the tube 4, a stainless steel locating member 7, the pellet 2, the fuel material 1, the pellet 3 and a stainless steel locating member 8 are then inserted, in the order stated, through open end 9 of the tube 4. The member has radiused ends 10, 11 and a longitudinal saw cut 12, whilst the member 8 has a radiused end 13 and a longitudinal saw cut 14.

FIGURE 1 shows a tubular support member 15 assembled together with end 9 of the tube 4 in such a manner that a portion of the outer surface of the member 15 engages the inner surface of the tube end 9. That portion of the member 15 inside the tube 4 has an open end with a radially inward directed flange 16, whilst that end of the member 15 outside the tube 4 is die swaged and closed by an argon arc end spot weld 17.

With the inner support member 15 and tube end 9 assembled as shown in FIGURE 1, an argon arc circumferential fillet weld 18 is formed to join these two components together.

After the formation of the weld 18, the member 15 and end 9 are subjected to a die swaging operation thereby forming an apertured neck 19 (FIGURE 2) on the assembly in the region of their engaged surfaces. The neck 19 is then cut through on the line indicated by arrows 20 thereby removing the welds 17, 18 and exposing an aperture 21. The tube 4 is then outgassed and filled with helium using the aperture 21 which is finally closed off by a helium arc spot weld 22 (FIGURE 3), sealing the member 15 and tube end 9 together.

The invention is not limited to the details described above by way of example with reference to the drawings. Thus the member 15 need not have the flange 16, though this is advantageous in that it defines an expansion gap 23 and provides for location of the fuel 1 and pellets 2, 3.

In carrying out some experimental end closures, a two-die swaging machine (Stevens and Bullivant No. 10) was used for the die swaging operations. The tubes of the fuel pins are held in a collet chuck carried by a barrel mounted on a feed table so graduated that the length of tube fed into the dies can be accurately controlled. In longitudinal section the die form resembled an arch with a semi-circular end, the two dies defining an axial outlet in the end. For the end 6 the outlet is smaller than for the end 9.

Other experimental end closures were made using a Stevens and Bullivant No. 4 two-die rotary swaging machine, the dies being shaped to provide a straight tapered portion between the main portion of the tube and the necks.

A support member similar to the inner support member 15 could be used at the end 6 as well as the end 9. It is considered to act as a mandrel, and it serves to reduce the incidence of crack defects during swaging. For the tube dimensions quoted above, the stainless steel member 15 typically has a wall thickness of 0.017" and the cold swaging operation typically is used to give a neck of outer diameter 0.16" and an inner support member 15 inner diameter (in other words, size of aperture or bore 21) of about 0.070", that is to say a significant reduction as compared with the 0.2" internal diameter of the tube 4.

Bursting tests at room temperature and 650° C. on tubes with the swaged and welded end closures indicated that in all cases the failures initiated in the unswaged portions of the tubes at pressures normally expected from tube bursting data.

The shaping of an end of a protective tube of a pin-type nuclear reactor element by swaging to form a neck is a significant feature of the invention. Thus other methods of shaping the ends of such tubes have been tried and shown to give serious disadvantages, which swaging avoids. With spinning it is difficult to obtain consistent results, whilst coning requires an axial load to deform the end into a die which is greater than the buckling load of the main portion of the tube, and rolling gives rise to wall thinning and cracking.

The weld 18 helps to ensure that there is no relative axial movement between the tube end 9 and the member 15 during the die swaging operation, whilst the welds 17, 18 help to avoid entry into the fuel pins of oil from the lubrication system of the machine used for the die swaging operation, which would otherwise contaminate the fuel 1 and pellets 2, 3.

The invention is also considered advantageous in that it avoids the use of welded end caps, thus avoiding the difficulties referred to above and end cap alignment problems, and enables the use of simple spot welds for sealing.

Whilst the member 15 represents an additional component, this is offset by the advantages referred to above, and the fillet weld 18 may be eliminated by using an interference fit between the member 15 and the tube 4.

For die-swaging a protective tube for or of a pin-type nuclear reactor fuel element has a small outer diameter (e.g. 0.23" for the tube or sheath 4) and a relatively large wall thickness (e.g. 0.015" for the tube or sheath 4).

We claim:
1. A method for closing an end of a protective tube for a pin type nuclear reactor fuel element comprising the steps of assembling a tubular support member together with the tube end, the tubular support member being fitted inside the tube end so that the internal surface of the tube end engages with the opposing external surface of the tubular support member, forming an apertured neck on the assembly in the region of the engaged surfaces by swaging, cutting the neck after swaging and sealing the aperture of the neck by welding.

2. The method of claim 1 wherein the tubular support member is positioned with a portion inside the tube and a portion outside the tube, the portion of the tubular support member inside the tube having an open end and the portion of the tubular support member outside the tube having a closed end.

3. The method of claim 2 wherein prior to forming the neck, the tube end and the tubular support member are joined together by welding.

4. The method of claim 2 wherein prior to sealing the aperture of the neck by welding, the tube is outgassed through the aperture of the neck and filled with an atmosphere of an inert gas.

5. The method of claim 1 wherein prior to forming the neck, the tube end and tubular support member are joined together by welding.

6. The method of claim 1 wherein prior to sealing the aperture of the neck by welding, the tube is outgassed through the aperture of the neck and filled with an atmosphere of inert gas.

References Cited

UNITED STATES PATENTS

| | | | |
|---|---|---|---|
| 2,776,473 | 1/1957 | Dailey | 29—475 |
| 2,924,877 | 2/1960 | Creutz | 29—473.3 |
| 3,118,819 | 1/1964 | Alfille | 176—79 |
| 3,141,227 | 7/1964 | Klepfer | 29—473.3 X |
| 3,145,465 | 8/1964 | Coolidge | 228—60 X |
| 3,180,804 | 4/1965 | Flora | 176—79 |
| 3,189,101 | 6/1965 | Blake | 176—79 X |
| 3,245,140 | 4/1966 | Markert | 29—473.3 X |
| 3,245,599 | 4/1966 | Johnson | 228—54 |
| 3,247,591 | 4/1966 | Panseri | 29—474.3 |
| 3,268,411 | 8/1966 | Alfille | 29—473.9 |

FOREIGN PATENTS

| | | |
|---|---|---|
| 873,370 | 7/1961 | Great Britain. |
| 1,080,000 | 12/1954 | France. |

JOHN F. CAMPBELL, *Primary Examiner.*

R. F. DROPKIN, *Assistant Examiner.*